United States Patent
Conti

[19]

[11] Patent Number: 6,109,000
[45] Date of Patent: Aug. 29, 2000

[54] METHOD AND DEVICE FOR HEAT-WELDING A COVERING BAND MADE OF THERMOPLASTIC MATERIAL TO A BLISTER BAND, WITH CONTROL AND REGULATION OF THE LONGITUDINAL CENTERING

[75] Inventor: Rino Conti, Ozzano Emilia, Italy

[73] Assignee: I.M.A. Industria Macchine Automatiche S.p.A., Ozzano Emilia, Italy

[21] Appl. No.: 09/194,856

[22] PCT Filed: Jun. 5, 1997

[86] PCT No.: PCT/IB97/00641

§ 371 Date: Dec. 3, 1998

§ 102(e) Date: Dec. 3, 1998

[87] PCT Pub. No.: WO97/46448

PCT Pub. Date: Dec. 11, 1997

[30] Foreign Application Priority Data

Jun. 6, 1996 [IT] Italy .................. BO96A0304

[51] Int. Cl.[7] .............. B65B 57/08; B65B 47/00
[52] U.S. Cl. .............. 53/51; 53/282; 53/329.4; 53/374.4; 53/559
[58] Field of Search .................. 53/51, 64, 282, 53/329.4, 374.4, 389.2, 559

[56] References Cited

U.S. PATENT DOCUMENTS

| | | |
|---|---|---|
| 3,126,431 | 3/1964 | Harder .................. 53/51 |
| 3,294,301 | 12/1966 | Richter .................. 53/51 |
| 3,411,767 | 11/1968 | Moser .................. 53/64 |
| 3,555,768 | 1/1971 | Miller .................. 53/64 |
| 3,589,095 | 6/1971 | James .................. 53/51 |
| 3,815,322 | 6/1974 | Wyslotsky . | |

FOREIGN PATENT DOCUMENTS 0 310 306 A1  9/1988  European Pat. Off. .
1558645  2/1968  France .

*Primary Examiner*—John Sipos
*Attorney, Agent, or Firm*—William J. Sapone, Esq; Nims, Howes, Collison, Hansen & Lackert

[57] ABSTRACT

A covering band (12) is pre-heated and then definitively heated in two subsequent areas (P,Z), and is subjected to primary pulling, in an area (T), where the covering band is pulled and applied to a blister band (1), and to secondary pulling in an area (R) which coincides with the pre-heating area (P). The speed of the covering band (12) is lower in the secondary pulling area (R), so as to determine a lengthening which corresponds at least to its maximum lengthening resulting from pre-heating. Cyclical detecting of reference marks (20) printed on the covering band determines temporary reducing of the covering band (12) speed in the secondary pulling point (R), so as to provoke an additional lengthening. The device includes pulling means (5,11) of the blister band (1) and covering band (12), pre-heating means (11) and heating means (13) for the covering band (12), detecting means (16), and driving means (30) acting with different speeds, controlled by the detecting means (16).

7 Claims, 2 Drawing Sheets

METHOD AND DEVICE FOR HEAT-WELDING A COVERING BAND MADE OF THERMOPLASTIC MATERIAL TO A BLISTER BAND, WITH CONTROL AND REGULATION OF THE LONGITUDINAL CENTERING

BACKGROUND OF THE INVENTION

The present invention relates to machines for packaging pharmaceutical products, in particular tablets, capsules or pills, into packages commonly known as blister packs.

It is known that pharmaceutical products, such as tablets, capsules or pills are usually introduced individually into receptacles made in a heat-formable band, which is closed with a covering band, usually by heat-welding.

Afterwards, the blister band with the products and covering band is cut so as to obtain single portions, containing one or more receptacles, which are packaged in cases and delivered to be distributed.

DESCRIPTION OF THE PRIOR ART

Until now, because of practicality and simplicity, the material used for covering band has been other than the heat-formable material from which the blister band was made and usually a sheet of aluminium has been used.

On the surface of the covering band destined to remain outside, there are written various notices, which must correspond to respective portions of the blister band, each of which contains the products of one package.

In order to obtain this correspondence, the covering band has printed thereon reference sings, which are read by an optical detector.

It is possible to act on the aluminium band tension to plastically change its length in predetermined parts on the grounds of the detector readings and prearranging the reference signs and notices relative to each package, suitably spaced.

This allows to restore the centring of the printed messages with respect to the relative packages, in case it is lost.

Following the necessity to use materials less and less harmful to the environment, substances like polypropylene, with high degree of biodegradability, have been used.

Polypropylene has been used for the production of blister band already for some time and the problems resulting from its high behaviour which varies in relation to different temperatures to which it is subjected as well as from some of its composition characteristics, have been settled by various solutions.

The use of different materials for blister band and covering band creates difficulties in subsequent disposal of scraps, including residues and wastes left after the packages production, because the two different materials should be separated before their recycling.

These difficulties would not be overcome but eliminated by producing packages using only one material for both bands.

However, it is difficult to connect the covering band to the blister band using the present techniques.

In fact, immediate heating of the covering band to the softening temperature, which allows its heat-welding, causes cracking of the material, which having become fragile as the result of rapid heating, gives way to mechanical stresses deriving from the joining to the blister band operation.

In particular, this results from the fact that polypropylene can be treated and manipulated without jeopardising its structure only within a very limited temperature range with respect to other thermoplastic materials.

Therefore, it becomes difficult to heat the covering band to the welding temperature within usual heating step time, because it is not possible to use heating means with operation temperature higher than the temperature range allowed by the material.

The solution of this problem, proposed by the present invention, consists in gradual pre-heating of the covering band carried out in a first step and then its definitive heating up to the necessary temperature carried out in a subsequent step.

In this way, it is possible to reach an advantageous compromise between the temperature difference between the band and heating means, and the period of time necessary to reach the heat-welding temperature.

As a matter of fact, the reduction of the temperature obtained by the heating means has been compensated by lengthening of space, in which the band is heated.

However, also this technique presents different substantial problems, the first of which derives from the material lengthening during the pre-heating step, because this lengthening not always can be quantified for certain, due to non uniform reaction of thermoplastic materials sensible to temperature.

As a result, the covering band tends to lengthen by detaching from the pre-heating means, causing loose turns in material, which can provoke jamming or folding of the material over itself.

It is also very difficult to maintain the messages printed on the covering band centred with respect to the respective packages, as it is heat-welded with the blister band.

SUMMARY OF THE INVENTION

The object of the present invention is to propose a method and a device for heat-welding of a covering band made of thermoplastic material to a blister band, also made of thermoplastic material, in particular polypropylene, ensuring that the messages printed on the covering band are always centred with respect to the areas of the blister band, which subsequently will form single packages, and without material loosening or folding.

In particular, the object of the present invention is to propose a method and a device that allow to obtain the right compromise between the quantity of warmth transmitted from the heating means to the covering band and the time necessary for carrying it out, without negative effect on the whole device working speed.

The above mentioned object is obtained by a method and device for heat-welding a covering band made of thermoplastic material to a blister band, with control and adjustment of the centring of the messages printed on said covering band with respect to the single packages defined in said blister band.

According to the invention, the method includes:
pre-heating of the covering band to a temperature lower than a heat-welding temperature, during its longitudinal translation movement in a pre-heating area situated upstream of an area where the same covering band is applied to the blister band;
gradual final heating of the covering band to the heat-welding temperature in an area included between the preheating area and the area where the same covering band is applied to the blister band;

pulling of the covering band in a primary pulling area, coinciding with the application area, and in a secondary pulling area situated in the region, or respectively upstream, of the pre-heating area, with the running speed of the covering band, in normal conditions, smaller in the secondary pulling area with respect to the primary pulling area, to such a degree that the covering band is normally lengthened in the area included between the primary pulling and application area and the secondary pulling area by a constant portion which is at least equal to maximum lengthening of the cover band resulting from the pre-heating.

The method also includes a cyclical detection, in time relation with the production of the packages, of reference marks in a predetermined area through which the covering band passes.

The reference marks are spaced out by a distance little smaller than the nominal distance between the packages on the blister band, diminished by the maximum lengthening of the same covering band resulting from the heating preceding the heat-welding operation.

In case a reference sign is detected, the pulling speed of the covering band is reduced for a predetermined period of time and in a predetermined entity in the secondary pulling area, so as to determine a corresponding additional lengthening of the covering band.

Then the normal conditions pulling speed of said covering band in the secondary pulling area are restored.

According to the invention the device includes:
primary pulling means for driving the blister band and the covering band heat-welded therewith into longitudinal motion;
secondary pulling means, situated upstream of the primary pulling means, for pulling the covering band with peripheral speed lower than the primary pulling means;
pre-heating means, situated in the region of the secondary pulling means, or respectively between the primary pulling means and the secondary pulling means;
means for heating the covering band to the temperature suitable for heat-welding with the blister band.

The device further includes detecting means activated in time relation with the production of the packages to detect periodically the position of the reference marks printed on the covering band at distances, smaller than the nominal distance between two parts destined to form two subsequent packages on the blister band, diminished by the maximum lengthening of the covering band resulting from the pre-heating, and driving means for the primary pulling means and secondary pulling means, which move, for a predetermined period of time.

The secondary pulling means move with speed lower than the primary pulling means by a fixed negative entity, in normal working conditions, and by an additional negative entity, in case the detection means detect the presence of reference marks.

The device made in accordance with the invention in particular allows to transmit heat from heating means to covering band along a longer part with respect to traditional techniques, keeping the difference of temperature more limited.

Further characteristics and/or variants of the invention are described in dependent claims.

BRIEF DESCRIPTION OF THE DRAWINGS

The invention is described in detail in the following, with reference to the enclosed drawings, in which.

BEST MODE OF CARRYING OUT THE INVENTION

With reference to the above described figures, the description follows of a series of situations characteristic to the method for heat-welding a covering band 12, made of thermoplastic material, with messages 25 printed thereon, to a blister band 1, with centring check and adjustment of the messages 25 with respect to the single packages 2 defined on the blister band 1.

It is useful to precise that the invention is based on the idea of taking advantage of the material thermoplasticity, trying to uniform and control its lengthening, so as to be able to define, with bigger certainty and definition, the reciprocal positioning gradually assumed by the covering band 12 with respect to the blister band 1.

Figure 1:
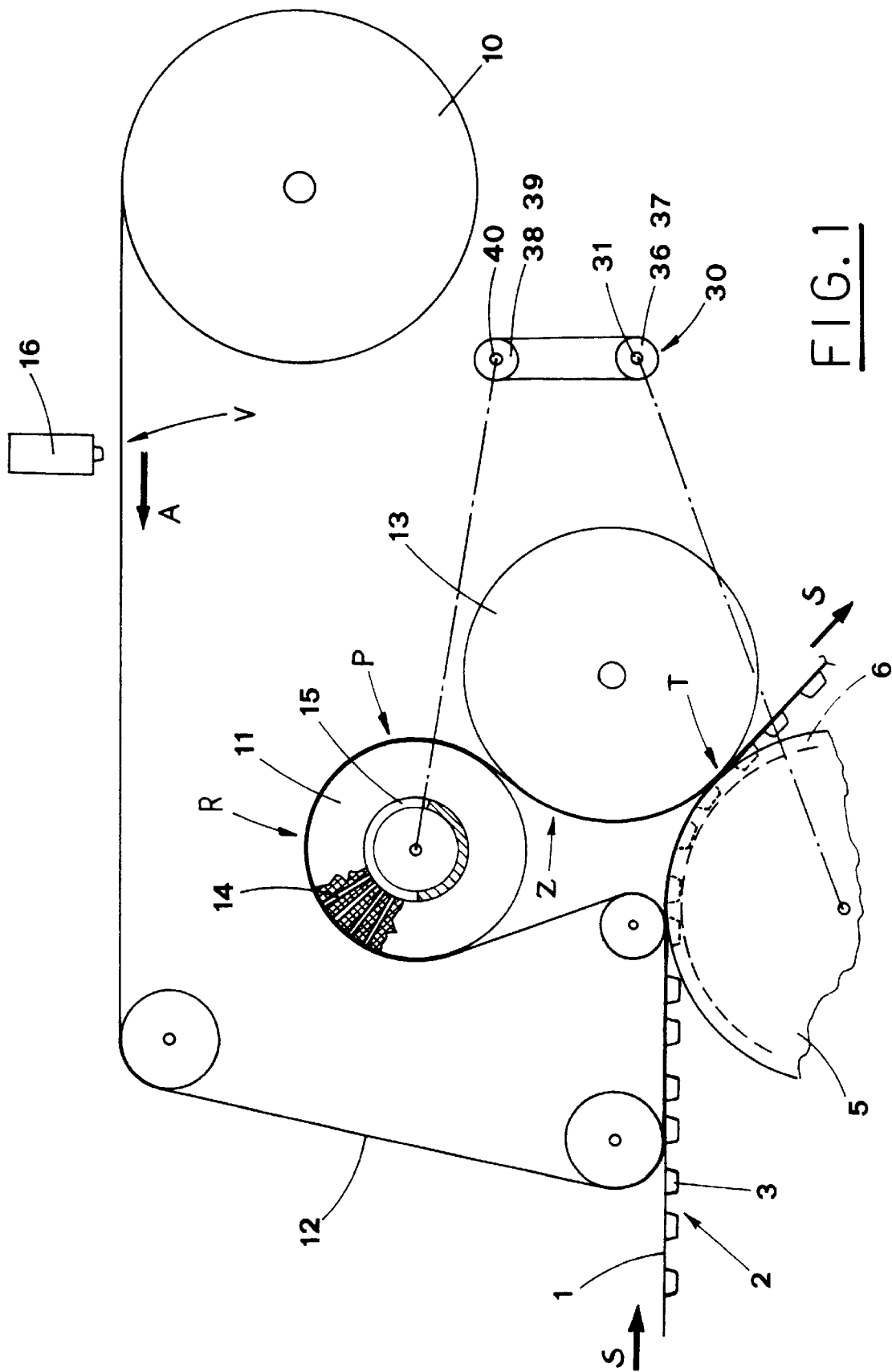
FIG. 1 shows a lateral schematic view of the device, on the grounds of which it is possible to define steps and characteristics of the claimed method.
Figure 3:
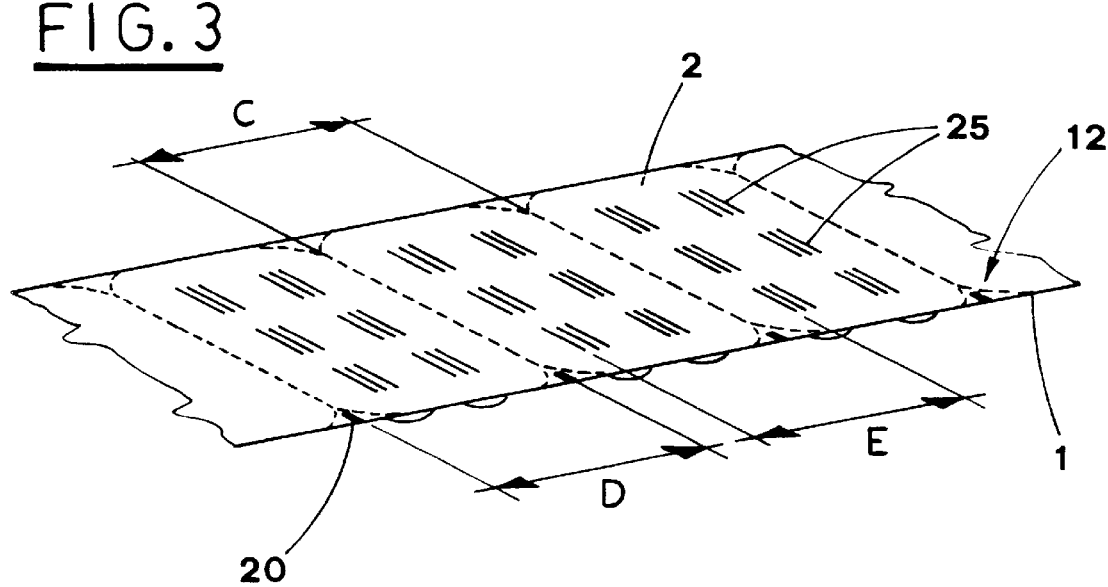
FIG. 3 shows a portion of blister band with covering band joined therewith by heat-welding.
Figure 2:
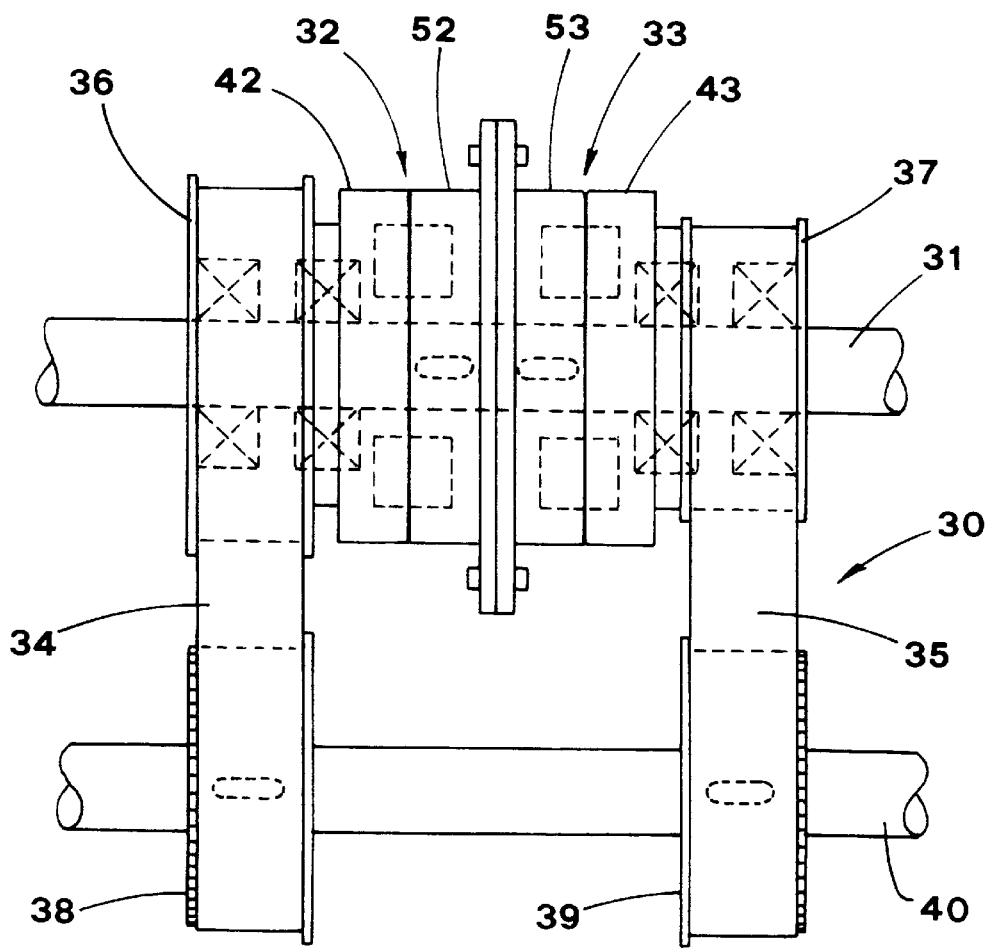
FIG. 2 shows a particular of a driving mechanism of the device of FIG. 1.

First, an area P of the covering band 12, situated upstream of an area T shown in FIG. 1, in which the covering band 12 is joined with the blister band 1, is pre-heated during its longitudinal translation movement in direction A.

The pre-heating brings the material to the temperature, which is few grades less than the heat-welding temperature, and anyway lower than a temperature which would cause material breakdown.

The band is maintained at this intermediate temperature and then gradually heated again, during its translation in an area Z, until it reaches the temperature suitable for heat-welding in the region of the joining area T.

As said above, it is evident that according to the present invention, the covering band 12 is heated gradually.

The covering band 12 is subjected to pulling action in two subsequent areas, i.e. in a primary pulling area coinciding with the joining area T, situated downstream of the pre-heating area P, and in a secondary pulling area R, situated upstream or respectively in the region of the pre-heating area P.

The running speed of the covering band 12, during normal operation, is lower in the secondary pulling area R than in the primary pulling area T, so as to obtain a regular lengthening of the part of the covering band 12, included between the end of the secondary pulling area R and the primary pulling area T. The lengthening thus obtained is constant and at least equal to the maximum lengthening of the band resulting from pre-heating.

Thus, the lengthening of the covering band 12 is every time equal to its maximum lengthening caused by the pre-heating, and can be easily compensated for by spacing the messages 25, printed on the covering band 12, according to distances E equal to the nominal distance C between the packages 2 diminished by this maximum lengthening value.

Afterwards, according to the present method, in a predetermined area V, through which the covering band 12 passes, reference marks 20 printed on the covering band 12 are cyclically detected, in relation with the subsequent cutting of single packages 2 from the blister band 1 joined with the covering band 12.

Likewise, the reference marks 20 are spaced out by a distance D, little smaller that the nominal distance C between the packages 2 diminished by the maximum lengthening of the same covering band 12 resulting from the heating preceding the heat-welding operation.

In case a reference sign 20 is detected, the pulling speed of the covering band 12 is reduced for a predetermined period of time and in a predetermined entity in the secondary pulling area R, so as to determine a corresponding additional lengthening of the covering band 12.

The task of this additional lengthening is to compensate for possible longitudinal displacements of the covering band 12 with respect to the blister band 1 due to mechanical displacements between the driving means and the blister band.

Since the only possible intervention on the covering band 12 is lengthening, it is supposed that the covering band 12 always moves out of register with respect to the blister band 1, in a limited way and this is not seen with the naked eye, in the forward direction S.

Therefore, the covering band 12, if and when necessary, is additionally lengthened in order to resume the conditions of centring of the messages 25 with respect to the packages 2.

For this purpose, the distance D between the reference marks 20, as well as the distance E between the messages 25, is made shorter again by a length, not seen with the naked eye, equal to the maximum single displacement taken in absolute value which can occur between the covering band 12 and the blister band 1 due to mechanical causes.

After a predetermined period of time has passed, the normal pulling speed of the covering band 12 is resumed in the secondary pulling area R.

The device carrying out the previously described method generally includes:

primary pulling means 5 for pulling the blister band 1 and the covering band 12 in longitudinal motion direction S;

secondary pulling means 11, situated upstream of the primary pulling means 5, for pulling the covering band 12 with peripheral speed lower with respect to the primary pulling means 5;

pre-heating means 11, situated in the region of the secondary pulling means 11 or respectively between the primary pulling means 5 and the secondary pulling means 11; and means 13 for heating the covering band 12 to the temperature suitable for heat-welding to said blister band 1, situated in the region of the point T, in which the covering band 12 is joined with the blister band 1, and acting on said covering band 12 along an area Z situated upstream the area T.

Further, the device includes detecting means 16, formed by e.g. an optical sensor, activated in an intermittent way in time relation with the definition of the packages 2 to detect the position of the reference marks 20 printed on the covering band 12 at distances D, smaller than the nominal distance C between two parts destined to form two subsequent packages 2 on said blister band 1, diminished by the maximum lengthening of the same covering band 12 resulting from the pre-heating.

Finally, driving means 30 acting on the primary pulling means 5 and secondary pulling means 11, which move, for a predetermined period of time, the secondary pulling means 11 with lower speed with respect to the primary ones by a fixed negative entity, in normal working conditions, and by an additional negative entity, when the detection means 16 detect the reference marks 20.

In particular, with reference to FIG. 1, the primary pulling means include a recessed roller 5, featuring impressions 6, which receive, in a clearance fit, the blisters 3 of the blister band 1.

In this way, the roller 5 is engaged with the blister band 1.

The primary pulling means include also a pressure roller 13 carried idle, parallel to the blister roller 5 and pressing on the assembly including the blister band 1 and covering band 12.

The roller 5 is connected with the driving means 30, while the pressure roller is driven into rotation, due to friction, by the two bands 1 and 12 assembly.

The heat-welding means include said pressure roller 13, which is heated to a suitable temperature.

The secondary pulling means include a roller 11, on which the covering band 12 turns around and which is controlled by the driving means 30.

Actually, the secondary pulling means and the pre-heating means are constituted by the same roller 11, which is heated to the temperature lower than the temperature necessary for heat-welding of the covering band 12 and the blister band 1.

The pre-heating roller 11 features radial bores 14 opening outwards and communicating with an internal vacuum room 15.

Thus, the covering band is kept adherent to the roller 11 in the pre-heating are P.

This results in double advantage, because complete adherence of the covering band 12 to the roller 11 is obtained, and the heat is transmitted from the roller to the band more gradually and uniformly.

The secondary pulling area R practically coincides with the pre-heating area P, but it is obvious that it could be situated also upstream of this area P, by arranging some devices in a different way.

The driving means 30 include a driving shaft 31, connected to the pulling roller 5 acting on the blister band and on the covering band in the heating and heat25 welding area T, and a driven shaft 40 connected with the pulling roller 11 acting only on the covering band.

The driving shaft 31 supports, coaxial therewith, two friction electromagnetic couplings 32,33, which are connected with means for motion transmission 34, 35, formed by e.g. toothed belts engaging with toothed wheels 38, 39 keyed onto the driven shaft.

Each of said electromagnetic couplings 32, 33 includes a clutch plate 42, 43, which in operating condition is pushed against a respective plate 52, 53 keyed onto the driving shaft 31 and which is connected with a toothed wheel 36, 37 coupled, by the respective belt 34, 35, with the corresponding toothed wheel 38, 39 keyed onto the driven shaft 40.

A speed ratio of the toothed wheels 39, 37 relative to the same clutch group is equal to 1, while a speed ratio between the toothed wheels 38, 36 is slightly lower than 1.

Each of the toothed belts 34 and 35, singularly or both, can be suitably replaced with a chain or a gear train.

The ratio between the roller 5 peripheral speed and the roller 11 peripheral speed, slightly higher than 1, is obtained by suitable dimensions of the same rollers and suitable speed ratios.

In normal working conditions, the activation of the electromagnetic clutch group 33 operates the toothed wheels 37 and 39, between which there is a unitary ratio and which are connected with each other by the belt 35, and the plate 53 keyed to the shaft 31 pulls with the driven shaft 40 with the same angular speed.

Therefore, as the second pulling roller 11 rotates with slightly lower peripheral speed, the first pulling roller 5 pulls the covering band 12.

Due to the pre-heating of the band 12, the material of which it is made, is stretched by a length that each time is equal to the maximum predictable lengthening of the band 12 caused by the pre-heating, and thus always makes up for the difference between the distance E, among the printed messages 25, and the distance C, among the packages.

In this way, possible uncontrolled lengthening of the covering band are avoided, and the band remains always tight and adherent to the pulling rollers.

However, since the distance D between the reference marks 20 as well as the distance E between the messages 25, are still shorter than the distance that it should be, as time passes, the reference marks 20 reach the detection area V, where the optical sensor, when activated, detects their presence.

When the machine is turned on, the covering band is situated in such a way that during the activation of the sensor the reference marks 20 are placed in correspondence thereto.

The activation can be carried out in any moment as long as it is in time relation with the production of each package 2 downstream of the primary pulling and heat-welding area T.

The detection of the reference marks 20 in the area V, by the sensor 16 and suitable control means, not shown because of known type, causes the disengagement of the clutch group 33 and contemporaneous engagement of the clutch group 32, connected to the toothed wheels 36 and 38 having the speed ration between them lower than 1.

As a consequence, the pulling roller 11 is further slowed down and the covering band 12 makes up also for this last difference in the distance between the marks.

After a predetermined period of time, equal to duration of one or more of package production 2 cycles, the working of the clutch group 33 is resumed and the clutch group 32 is deactivated, thus bringing the whole back to the start conditions, until the sensor 16 detects again the reference mark 20 in the area V.

Therefore, the mechanism for making up for the errors in longitudinal positioning between the two bands, blister band and covering band, always assumes an out of register error of the covering band 12 with respect to the blister band 1 in the moving forward direction S.

If the error really exists, the reference mark 20 will be detected by the sensor 16 and the difference will be recovered by an additional lengthening of the covering band 12 obtained by slowing down of the covering band pulling roller 11 for a predetermined period of time.

If this error does not exist, the reference mark 20 will be moved forward toward the sensor, due to the additional shortening of the covering band.

If this mark is detected, the previously described case will recur and an additional lengthening will be done. If it is not detected because the entity of the relative displacement is not big, then it will be recovered by an opposite direction error of a subsequent cycle or will be accumulated with other displacements in the same direction, occurring in subsequent cycles until it becomes big enough to be detected by the sensor 16.

On the other side, if the displacement error of the covering band 12 with respect to the blister band 1 occurs in the direction opposite to the direction S, the reference mark 20 will not be detected by the sensor 16, but the displacement will be recovered by the additional shortening of the distance between the marks on the covering band, without causing additional lengthening of the band.

The results of the errors in both directions and of the additional lengthening gradually superimpose so as to cause such a relative displacement of the covering band 12 with respect to the blister band 1 that, during the sensor 16 activation, the reference marks 20 are situated always upstream of it, but tendentiously moved toward it, until they are detected.

According to an extreme ideal hypothesis, when the sensor 16 is activated, no displacement of the reference mark 20 position will occur when the total error due to mechanical causes determines a relative displacement of the covering band with respect to the blister band is equal to the maximum width of the additional shortening.

The group aimed at determining the additional change of the speed of the second pulling roller 11, including the two clutch groups 32, 33, can be replaced with a continuous change group of known type, thus obtaining also the possibility of changing the entity of the additional lengthening of the covering band 12.

In this case, it is possible to act just on the entity of the additional lengthenings, not on their occurrence.

It is also possible to determine both lengthenings, fixed and additional, by necessary variations carried out by this change group acting on the secondary pulling roller 11.

The advantages resulting from the use of the described method as well as of the device carrying it out are obvious. The most important advantage is the possibility of using only one material, little harmful to the environment, like e.g. polypropylene, for producing both bands, the blister band as well as the covering band, thus obtaining a container made practically of only one material.

Another, extremely important advantage derives from the fact that it is possible to recycle scraps, residues and wastes, left after the packages production, without the necessity to separate their components, in particular without separating the parts of the blister band from the corresponding parts of the covering band.

Obviously, also other thermoplastic materials can be used, with other possible advantages.

It is understood that what above, has been described as a mere, not limitative example, therefore possible variants resulting from practice and use are protected by the present invention as described above and claimed hereinafter.

What is clamed is:

1. A device for heat-welding a covering band made of a thermoplastic material to a blister band to form multiple packages, with control and adjustment for centering messages printed on said covering band with respect to each single package defined in said blister band, said device comprising:

primary pulling means for driving said blister band and said covering band heat-welded therewith in a longitudinal motion;

secondary pulling and pre-heating means, located upstream of said primary pulling means, said secondary pulling and pre-heating means comprising of a single roller, around which the covering band turns, for pulling said covering band at a peripheral speed lower than a speed of said primary pulling means and for heating the covering band to a temperature lower than a temperature necessary for heat-welding of the covering band with said blister band;

means for heating the covering band to the temperature necessary for heat-welding with said blister band, said heating means being located in an area between a pre-heating area and an area where the covering band is applied to the blister band.

2. The device, according to claim 1, further comprising:

detecting means upstream of said second pulling means, activated in an intermittent way in time relation with the production of the packages to detect periodically the position of reference marks printed on the covering band at distances, smaller than the nominal distance between two parts destined to form two subsequent packages on said blister band, diminished by the maximum lengthening of the covering band resulting from the pre-heating;

driving means for said primary pulling means and secondary pulling means, which move, for a predetermined period of time, the secondary pulling means with a speed lower than the primary pulling means by a fixed amount, in a normal working condition, and by an additional amount, when the detection means detect the presence of reference marks.

3. The device according to claim 1, wherein said primary pulling means include a roller with impressions for receiving, in a clearance fit, the blisters of said blister band, the roller being engaged with said blister band, a pressure roller, parallel to the blister roller being pressed on the assembled blister band and covering band.

4. The device according to claim 1, wherein said primary pulling means include a roller with impressions for receiving, in a clearance fit, the blisters of said blister band, the roller being engaged with said blister band, a pressure roller, parallel to the blister roller, being pressed on the assembled blister band and covering band, the heat-welding means being formed by the pressure roller being heated to the temperature necessary for heat welding.

5. The device, according to claim 1, wherein said pre-heating roller has radial bores opening outwards and communicating with an internal vacuum chamber.

6. The device, according to claim 2, wherein said driving means has a driving shaft, connected to said pulling means and supporting, coaxial therewith, two friction electromagnetic couplings, means for motion transmission connected to said couplings for acting according to different speed ratios and being linked to a driven shaft connected with said secondary pulling means.

7. The device, according to claim 6, wherein each of said electromagnetic couplings includes a clutch plate, which in an operating condition is pushed against a respective plate keyed onto said driving shaft and which is connected with a toothed wheel coupled, by a belt, with a corresponding toothed wheel keyed onto the driven shaft.

* * * * *